Figure 1:
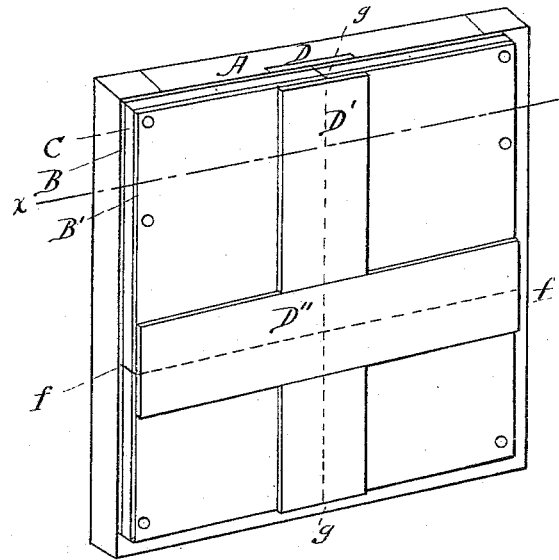

(No Model.)

J. G. MERRILL.
PROTECTING BUILDINGS FROM FIRE.

No. 323,518. Patented Aug. 4, 1885.

WITNESSES
J. M. Dolan.
Fred. B. Dolan.

INVENTOR
Jonathan G. Merrill
by his attys
Clarke & Raymond

UNITED STATES PATENT OFFICE.

JONATHAN G. MERRILL, OF QUINCY, ASSIGNOR TO MOODY MERRILL, OF BOSTON, MASSACHUSETTS.

PROTECTING BUILDINGS FROM FIRE.

SPECIFICATION forming part of Letters Patent No. 323,518, dated August 4, 1885.

Application filed December 22, 1884. (No model.)

*To all whom it may concern:*

Be it known that I, JONATHAN G. MERRILL, of Quincy, in the county of Norfolk and State of Massachusetts, a citizen of the United States, have invented a new and useful Improvement in Protecting Buildings from Fire, of which the following is a full, clear, and exact description, reference being had to the accompanying drawings, forming a part of this specification, in explaining its nature.

This improvement relates to the preparation and application of sheets of material to the walls, ceilings, and floors of buildings, and to shutters for the purpose of better protecting them against fire. The materials used for this purpose are a particular quality of clay-board, asbestus felt or asbestus paper, and silicate of soda. The clay-board is made of fibrous material intimately mingled with and thoroughly incorporated into clay, or clay combined with other refractory mineral matter, such as lime or hydraulic lime.

It is well known that in the manufacture of pasteboard, and, indeed, of wall-papers, large quantities of clay, or of milk of lime, or milk of magnesian lime, may be incorporated with the fiber of the pasteboard or of the wall-paper. A thickness of about one-quarter of an inch of such material as this would be a fairly fire-proof material; but unless it is strongly compressd, which is easily done by calendering, such a board would not have sufficient strength to be applied to ceilings, or, indeed, to walls, and in many cases such boards would be susceptible to the influences of a moist atmosphere. This clay-board is also not a perfectly fire-proof material, because it contains as a fiber to hold it together a considerable portion of combustible material, which is introduced into it for substantially the same purpose that hair is introduced into plaster. It is also well known that the asbestus felt, particularly the thinner varieties, have very admirable fire-proof qualities, but are of small tensile strength. Silicate of soda, too, is a fairly good fire-proof material, but is quite hydroscopic; but by a combination of these three materials, in the manner herein set forth, a very tough, hard, practical fire-proof lining can be made, which can be easily applied.

The clay-board is prepared as hard as possible, and is made in sheets of any suitable size, which are cut with square edges, so as to fit neatly together. This board should be about one-eighth of an inch thick, if it is to be used in successive layers. It ought not to exceed about a quarter of an inch to a third of an inch, as the thickest sort to be used. The board is thoroughly covered with silicate of soda of about the consistency of flour paste, and there is applied to it a coating of asbestus felt, which may be quite thin, about as thick as ordinary blotting-board, or even thinner; and this asbestus felt is laid on as smooth as is possible, and may be covered with a varnish of silicate of soda. When clay-board is used in single layers, the asbestus felt is applied on both sides, as will be understood from the drawings, Figure 1, in which A is the frame to which the fire-proof material is to be attached—as, for instance, the studding, furring, or ceiling timbers of a room.

B is a layer of asbestus felt on one side of the clay-board, next the frame. C is the clay-board, and B' is a similar layer of asbestus felt on the exterior of the clay-board. Over the joints formed by the abutting pieces of clay-board and asbestus felt, (represented in the drawings by the dotted lines *ff* and *gg*, Fig. 1,) are applied with silicate of soda, on each side the joint-covers D D'. I prefer to cover these joints on both sides, as the joint represented by the dotted line *g g* of Fig. 1 is covered; but the covering upon the under or inner side may be omitted, as shown at the joint represented by the dotted line *ff*.

Figure 2:
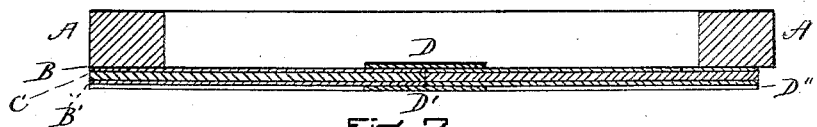

Fig. 2 in the drawings represents the construction shown in Fig. 1 in section along the dotted line *x x*.

Figure 3:
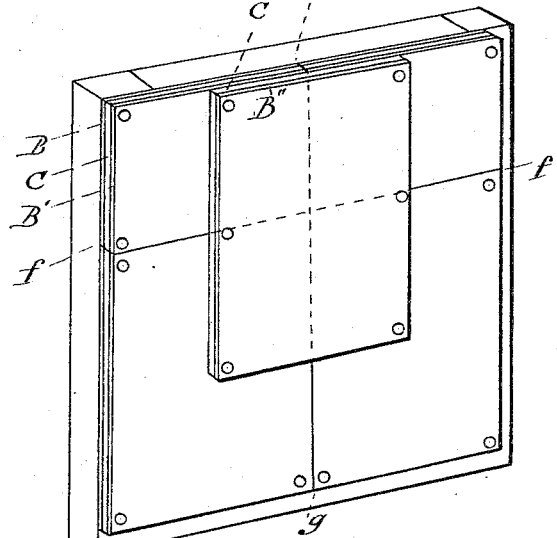

In lieu of applying the fire-proof material in a single layer, as represented in Figs. 1 and 2, it may be built up of several layers, in which case the asbestus felt would generally be applied only to the exterior and not to the interior surfaces of the pile, the different layers of clay-board and asbestus felt being joined together by silicate of soda interposed between them, with or without the interposition of the asbestus felt. I prefer, however, in applying this material, to apply it so as to break the joints, as shown in Fig. 3, in which case *a* would be the frame, as before, and B and B' would be layers of asbestus felt, the layer B' being omitted, if desired. C would represent one layer of clay-board, and C' another layer of clay-board, applied so as to break joints with the layers below. B² would be a surfacing layer of asbestus felt for the exterior surface of the whole combined structure. This material is fastened to the wooden frame-work by finishing-nails; and I prefer to finish it with a varnish of silicate of soda applied on the surface of the asbestus felt.

Figure 4:
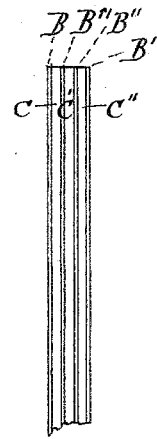

Still another variety of application is shown in section in Fig. 4. In this case the various layers of clay-board C C' C'' are made up with intermediate and exterior layers of asbestus felt, B, B', B'', &c., all cemented together by silicate of soda. This would be applied in sheets, and to cover the joints in this case, or in any other, asbestus felt may be applied like wall-paper. In such case, to secure the covering of the joints, the width of the felt and of the board, as made up for use, would differ—as, say, thirty-six-inch felt and thirty-five or thirty-seven inch clay-board. For such an application of asbestus felt, I recommend the joints to be butted and not lapped, the application being, in fact, like hanging cartridge-paper. Of course wall-paper of any variety may be applied over the asbestus felt, if desired; but the cement used should be silicate of soda, and not flour paste, if the best results are to be had.

In order to prevent the silicate of soda from deliquescing, and also to give to the finish of the fire-proof lining some desirable tints, I mix certain dry mineral colors with the silicate of soda, and for these colors I use the metallic oxides—such as red lead, iron oxides, manganese oxide, chrome oxide, oxide of cobalt, zinc white, ochres, with all of which there is more or less tendency to combine into insoluble compounds with the silicic acid of the silicate of soda, which also will occur when lime or magnesia, or both, are in the clay-board—whereby an insoluble silicate is formed, more or less tinted in the case of the mineral colors referred to, according to the pigment used, not, however, necessarily in all cases, according to the original color of the pigment employed, because some of the pigments suggested are of different color from the silicates of the same metal.

Some of the metallic oxides above named cause the silicate of soda to harden more rapidly than others, and make it difficult to apply; but I have found from experience that in such case the hardening, drying, or fixing of the silicate paint or of the clear silicate is delayed by admixture of a small quantity of glycerine, while in the end the final hardness of the applied coat is not interfered with, and I therefore recommend this addition when the silicate of soda fixes quicker than desired.

It will be noticed that by this construction the clay-board and its contained combustible fiber is shielded from the action of heat by the silicate-of-soda cement, and by at least one layer of asbestus felt saturated with silicate of soda. So that this clay board, when exposed to the action of heat, will have its fibers charred rather than burned by the flame to which it may be exposed, because, being sealed in asbestus and glass, it is subject rather to dry distillation than to burning. It will also be observed that the means for thus sealing up the clay-board from flame and atmospheric air is to break joints in all instances, either by the aid of the strip D D or by a layer of clay-board covered on one side at least with asbestus felt, which forms the second layer or exterior layer of the sheathing, or by asbestus felt applied like wall-paper.

In case of making this application to shutters which are to be exposed outside of a house, the asbestus-protected clay board can be applied to the shutters by lag-screws or any other suitable fastening, and the body of the shutter may be, if desired, of iron; but the best construction for shutters, in my judgment, is to make them of two comparatively thin layers of wood, inclosing between them a layer of asbestus-protected clay-board, hereinbefore described, and to nail or screw the parts together in a pile. In such a case as this the wooden shutters should be protected on one or both sides by a tin sheathing or plating.

This material of asbestus-protected clay-board is admirably adapted to place between the upper and lower floors of a building as a flame-barrier.

Having thus fully described my invention, I claim and desire to secure by Letters Patent of the United States—

1. As a fire-proof material for walls, ceilings, floors, shutters, &c., the combination of layers of clay-board and layers of asbestus felt cemented together by silicate of soda, and arranged with an asbestus-felt covering to the joints of the abutting pieces of clay-board, substantially as described.

2. As a means of delaying the fix of silicate of soda or tinted silicate of soda, the addition of glycerine to the solution, substantially as described.

JONATHAN G. MERRILL.

Witnesses:
J. M. DOLAN,
FRED. B. DOLAN.